United States Patent

Sarrail

[15] 3,636,998
[45] Jan. 25, 1972

[54] METHOD OF MANUFACTURING HOLLOW CORE PANELS WITH EMBOSSED SHAPED FRAMES

[72] Inventor: John L. Sarrail, Covina, Calif.
[73] Assignee: Evans Products Company, Portland, Oreg.
[22] Filed: Apr. 15, 1970
[21] Appl. No.: 28,754

[52] U.S. Cl..................................144/328, 144/134, 144/3, 144/326
[51] Int. Cl..........................................B27m 1/00
[58] Field of Search..............144/328, 326, 309 A, 309, 314, 144/315, 316, 319, 323, 3, 134

[56] References Cited

UNITED STATES PATENTS

| | | | |
|---|---|---|---|
| 291,436 | 1/1884 | Wagner | 144/328 X |
| 353,364 | 11/1886 | Mankey | 143/328 X |

FOREIGN PATENTS OR APPLICATIONS 733,948  7/1932  France...................144/328

Primary Examiner—Donald R. Schran
Attorney—Buckhorn, Blore, Klarquist and Sparkman

[57] ABSTRACT

A method of making hollow core panels and like structures having an embossed shaped frame comprises cutting a dado into the face of a piece of frame stock parallel to the outer edge thereof, embossing a design into such dado along the length thereof and forming a frame from the piece of frame stock. A facing sheet is adhered to the embossed face of the frame and a backing sheet to the back of the frame, and such facing and backing sheets extend over the outer edges of the frame. The thus faced and backed frame is then passed through a shaper to form a desired edge detail, the shaper cutting the facing sheet back from the outer edges of the frame at least to expose the embossed dado therein.

9 Claims, 9 Drawing Figures

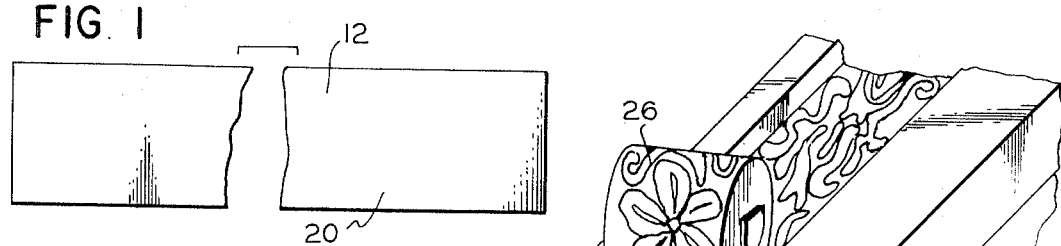
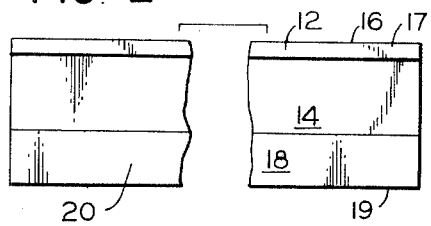
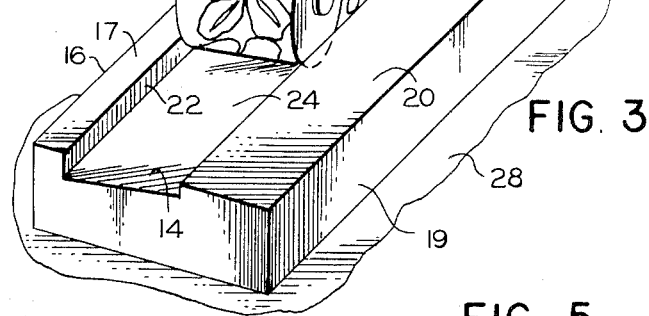
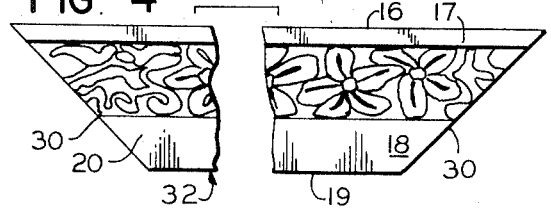
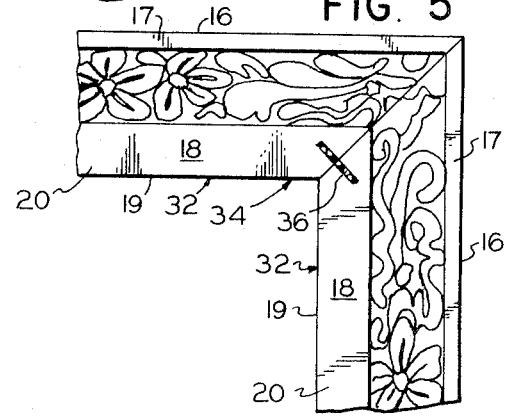
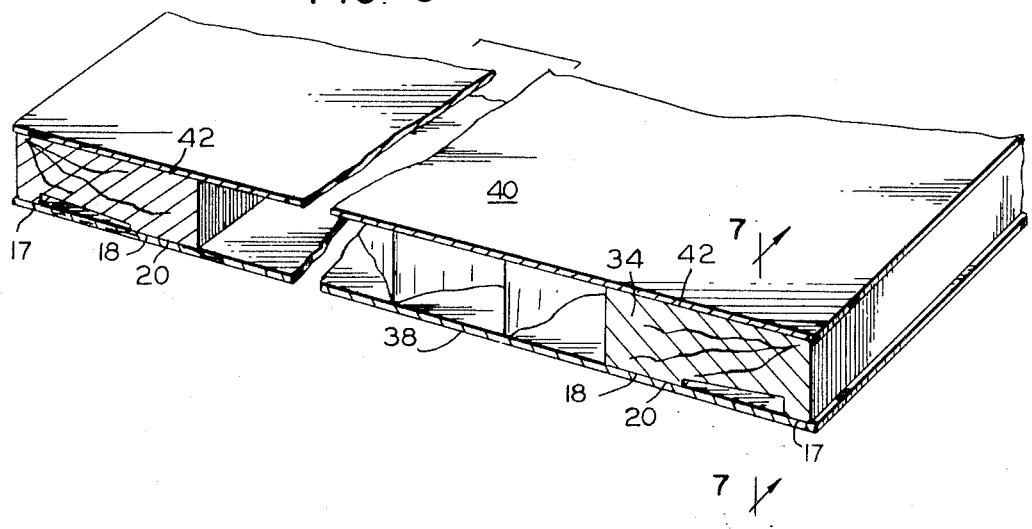

PATENTED JAN 25 1972

JOHN L. SARRAIL
INVENTOR

BY
BUCKHORN, BLORE, KLARQUIST & SPARKMAN
ATTORNEYS

METHOD OF MANUFACTURING HOLLOW CORE PANELS WITH EMBOSSED SHAPED FRAMES

BACKGROUND OF THE INVENTION

This invention relates to the manufacture of hollow core panels such as cabinet doors and, more particularly, to the manufacture of such panels having embossed shaped frames.

Hollow core cabinet doors and the like structures have been heretofore manufactured by cutting frame stock to an appropriate length with a miter cut on both ends. A frame has then been assembled and suitable sheet material such as plywood or hardboard has been adhered to both sides thereof to form the face and back. The thus laminated blank has then been shaped on all four sides to achieve a desired edge profile.

It has also been known to emboss wood by applying heat and pressure thereto, as by means of a hot detailed metal roll passing over the wood which is in turn supported by a backup roll or plate. The embossing of the shaped edge of a hollow core cabinet door, however, has not been heretofore achieved.

It is thus the primary object of the present invention to provide a method of making a hollow core panel having an embossed shaped edge detail.

It is a further object of the present invention to provide a method of making such a panel having an embossed shaped frame wherein the edge detail is embossed prior to the completion of the panel, thereby to achieve such a panel without an overlap of embossing at each corner.

It is a still further object of the present invention to provide such an embossed shaped frame on a hollow core panel wherein the design of the shaped edge permits an undercut on the edge, such as is used in a fingergrip detail without any danger of fracturing or cracking the frame during the embossing thereof.

Summary of the Invention

In accordance with the foregoing objects, I have provided a method of making hollow core panels and like structures having embossed shaped frames which comprises cutting a dado in the face of a piece of frame stock parallel to the outer edge thereof, embossing a design into the dado along its length and forming a frame from the piece of frame stock. A facing sheet is then adhered to the embossed face of the frame and a backing sheet to the back of the frame, such facing and backing sheets extending over the outer edges of the frame. The thus faced and backed frame is then passed through a shaper to form a desired edge detail, the shaper cutting the facing sheet back from the outer edges of the frame at least to expose the embossed dado therein.

A hollow core panel made by the method of the present invention is unique in that such a panel cannot be duplicated by embossing the shaped edge after the panel has been fabricated. Were an attempt made to emboss the shaped edge detail of a completed panel, an overlapping of the embossing would result at each corner thereof which would destroy its appearance.

A hollow core panel such as a cabinet door made by the method of the present invention is not limited as to the design of the shaped edge detail, as would be the case if embossing were to be attempted after the door had been completely fabricated. Heat and pressure are both required for embossing. If a completed door having an undercut edge were to be embossed after the fabrication of the door had been completed, the pressure necessary to accomplish the embossing of the edge surface might fracture or crack the undercut edge. A door constructed by the present invention is not subject to any such limitations.

BRIEF DESCRIPTION OF THE DRAWINGS

FIG. 1 is a view of a piece of frame stock suitable for use in the method of the present invention.

FIG. 2 is a top view of the piece of frame stock illustrated in FIG. 1 and showing the dado which is cut into the face thereof.

FIG. 3 is a view of the embossing of the dado by means of an embossing roll.

FIG. 4 illustrates the embossed frame stock cut with both ends mitered.

FIG. 5 illustrates a method of attaching the thus cut frame stock into a frame.

FIG. 6 is a sectional view of the frame of FIG. 5 after the facing and backing sheets have been adhered thereto.

DESCRIPTION OF THE PREFERRED EMBODIMENT

Figure 7:
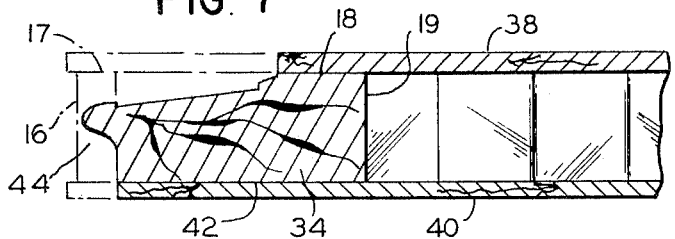
FIG. 7 is a sectional view taken on line 7—7 of FIG. 6 and illustrating in phantom lines the material that is removed by the shaper.

Referring to the drawings, a hollow core panel 10 is made according to the method of the present invention by first selecting a piece of frame stock 12 and cutting a dado 14 into a face 20 parallel to an outer edge 16 thereof, as illustrated in FIGS. 2 and 3. Preferably the dado 14 must be located no closer than about one-quarter inch from the outer edge 16, thus to leave an uncut edge portion 17 in the face.

The dado 14 may be of any width. However, the remaining portion 18 of the face 20 of the inner edge 19 preferably should be at least about three-quarters inch wide to provide sufficient surface for adhering the facing sheet to the frame, as will be hereinafter described.

Preferably the depth 22 of the dado is made sufficient to allow the ultimate shaping of the desired edge detail on the finished product without cutting into the embossed design in the bottom surface 24 thereof. Stated otherwise, the depth 22 of the dado 14 should preferably be greater than the amount of material ultimately removed from the outer edge portion 17 of the piece 12 during the final shaping operation.

The bottom surface 24 of the dado should also preferably be cut at an angle which is similar to or compatible with the ultimate shaped edge detail of the finished door. Cutting the dado 14 in this manner permits the shaper knives to cut the desired edge detail on the finished product without interfering with the embossed design made in the bottom surface 24.

After the dado 14 has been thus cut into the piece of frame stock, a heated embossing roller 26 is rolled along the bottom surface 24. The piece 12 is supported by a rigid fixture 28 as shown in FIG. 3 during the embossing to provide sufficient backup to accomplish the desired result.

The thus embossed piece 12 is thereafter cut to appropriate lengths with both ends 30 mitered as shown in FIG. 4. The mitered pieces 32 are attached as shown in FIG. 5 to form the frame 34. Any type of metal fastener may be used to so attach the pieces 32. For example, a corrugated fastener 36 is illustrated in FIG. 5. To miss the embossed dado, however, the fastener 36 is preferably placed across the portion 18 of the inner edge 19, which is the widest area of the frame face 20.

The thus formed frame 34 is thereafter run face down through a glue spreader such that the glue is applied simultaneously both to the face surface 20 and the back surface 42. As shown in FIG. 6, a facing sheet 38 is then placed in contact with the embossed face 20 so as to extend over the outer edge portions 17 of the frame, preferably extending at least to the outer edges 16 thereof. A backing sheet 40 is similarly placed in contact with the back 42 of the frame. The backing sheet 40 also extends over the outer edge portions 17 and preferably at least to the edges 16 thereof.

The assembly is thereafter placed face down in a press (not shown) to complete the adhering of the facing and backing sheets 38 and 40 to the respective surfaces of the frame. The frame is placed face down while being passed through the glue spreader and while in the press to obviate the possibility of excess glue running into the embossed dado 14.

The thus faced and backed frame is thereafter passed through a shaper to form the desired edge detail which is compatible with the embossed dado cut therein. Specifically, as shown in FIG. 7, the cutting knives of the shaper cut the facing sheet 38, the backing sheet 40 and the outer edge portion 17 of the frame to form a desired edge profile. Such cutting is sufficient at least to expose the embossed dado 14. If desired, the shaper can actually form an undercut 44 in the edges 16, as illustrated in FIG. 7.

Figure 8:
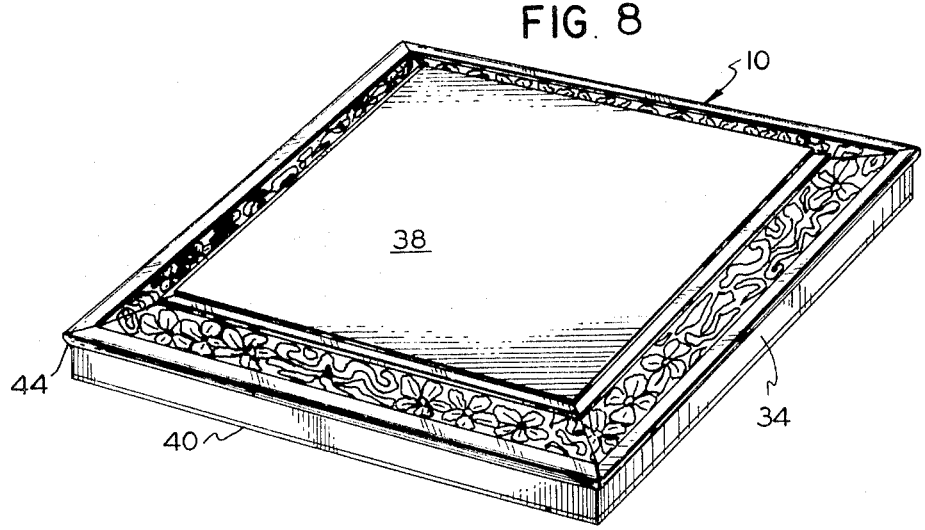
FIG. 8 is a perspective view of a finished hollow core panel made according to the method of the present invention.
Figure 9:
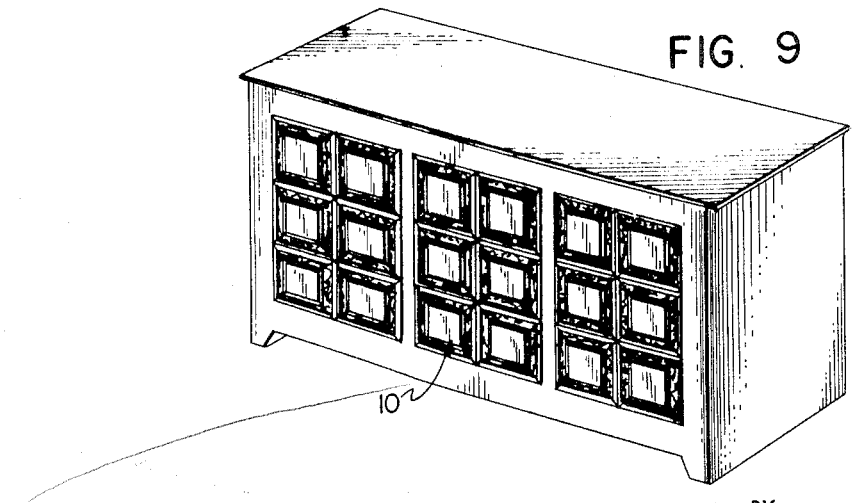
FIG. 9 illustrates a piece of furniture in which hollow core panels such as those illustrated herein have been incorporated.

The completed panel is shown in FIG. 8. It will be noted that the embossed shape edge detail is not subject to any overlapping at the corners which would be the result were the embossing performed after assembly. Decorative use of panels constructed in accordance with the present invention is illustrated in FIG. 9 wherein a plurality are assembled in the form of a front for a buffet or similar cabinet.

I claim:

1. A method of making hollow core panels and like structures having an embossed, shaped frame, comprising
   cutting a dado into the face of a piece of frame stock parallel to the outer edge thereof;
   embossing a design into said dado along the length thereof;
   forming a frame from said piece of frame stock;
   adhering a facing sheet to the embossed face of said frame and a backing sheet to the back of said frame, said facing sheet and said backing sheet extending over the outer edges of said frame; and
   passing said faced and backed frame through a shaper to form a desired edge detail, said shaper cutting said facing sheet back from said outer edges of said frame at least to expose said embossed dado therein.

2. The method of claim 1 in which said dado is cut at least one-quarter inch from said outer edge of said piece of frame stock.

3. The method of claim 1 in which said dado is cut at least three-quarters inch from the inner edge of said piece of frame stock.

4. The method of claim 1 in which the depth of said dado is greater than the depth said shaper cuts into said outer edge of said piece of frame stock.

5. The method of claim 1 in which said dado is embossed by rolling a heated embossing roller along the bottom thereof while the back of said piece of frame stock is rigidly supported.

6. The method of claim 1 in which said frame is formed by cutting said embossed piece of frame stock with mitered ends.

7. The method of claim 6 in which said mitered ends of said piece of frame stock are attached to form said frame by inserting a fastener across the inner edge portions thereof.

8. The method of claim 1 in which said facing sheet and said backing sheet are adhered to the respective faces of said frame such that they extend to at least said outer edges of said frame.

9. The method of claim 8 in which said facing sheet and said backing sheet are adhered to the respective faces of said frame while the latter is face down.

* * * * *